United States Patent Office 3,519,581
Patented July 7, 1970

3,519,581
METHOD OF PRODUCING SYNTHETIC LIGNIN-POLYISOCYANATE RESIN
Howard H. Moorer, Walter K. Dougherty, and Frank J. Ball, Charleston, S.C., assignors to Westvaco Corporation, New York, N.Y., a corporation of Delaware
No Drawing. Original application Aug. 3, 1959, Ser. No. 831,017. Divided and this application Jan. 13, 1967, Ser. No. 608,960
Int. Cl. C08h 5/02; C08g 22/08
U.S. Cl. 260—17.5        3 Claims

ABSTRACT OF THE DISCLOSURE

Lignin dissolved in a solvent therefor is reacted with an organic polyisocyanate that is in intimately dispersed relation with respect to the dissolved lignin. The solvent may be a volatile solvent or a substantially non-volatile solvent containing hydroxyl groups such as a glycol that also is reactive with the polyisocyanate. In certain cases the polyisocyanate itself may be the solvent for the lignin. The non-volatile solvent containing hydroxy groups, when used, may be esterified with carboxyl groups of the lignin prior to reaction of the lignin with the polyisocyanate.

CROSS-REFERENCE TO RELATED APPLICATION

This application is a division of application Ser. No. 831,017, filed Aug. 3, 1959, and now abandoned, for Synthetic Lignin Resin and Resin Products and the Manufacture Thereof.

BACKGROUND OF THE INVENTION

Field of the invention

This invention relates to resins and relates more particularly to synthetic resins produced by chemical reaction between molecularly less complex substances and to products comprising said resins.

This invention is concerned more especially with the production of such synthetic resinous reaction products utilizing lignin recovered from natural ligno-cellulose material.

Description of the prior art

In obtaining free cellulose fiber from natural lignocellulose material the ligno-cellulose material ordinarily is subjected to treatment whereby the lignin content is solubilized sufficiently to permit the formation of an aqueous slurry from which the fibers may be separated. The dissolved lignin, which is in the neighborhood of 25% of the natural ligno-cellulose, is contained in the solution from which the fibers are separated and finds such limited commercial application that almost all lignin solutions are either sewered or disposed of by partial evaporation of the water content and spraying the resulting concentrate into a furnace wherein the lignin is burned and from which the inorganic treating chemicals used in the pulping operation may be at least partially recovered. When lignin is recovered from a pulping operation in dry condition it generally is in the form of an amorphous brown powder and may be purchased from producers at a cost of only a few cents per pound.

The limited commercial utilization of lignin is occasioned principally by reason of its physical and chemical characteristics. Thus lignin is not resistant to water and is soluble in alkaline solutions. Moreover, it is a nonthermosetting thermoplastic which tends to disintegrate if heated above about 200° C. and which, if formable at all from the amorphous powdered condition as recovered, merely provides a crumbly mass having little or no strength.

Lignin as it occurs in natural ligno-cellulose material is a complex substance in the nature of a non-uniform polymeric structure in which the basic molecular configuration is believed to be derived from coniferyl-type alcohols with the creation of repeating propyl phenol units. The exact structure of lignin, however, is uncertain. A vast amount of research work has been accomplished to determine the structure, but to date no structure has yet been set forth which satisfactorily explains all the chemical and physical characteristics of lignin. The presence of ether linkages within the structure and the presence of benzense rings, methoxyl groups, and both alcoholic and phenolic hydroxyls has however, been well established. From our work it appears that a carboxyl group also is present in the molecule and the presence of a carboxyl group per molecular weight of about 1,000 for the lignin greatly aids in explaining some of the characteristics exhibited by lignin in its reaction with polyisocyanates in the practice of this invention.

The lignin as it occurs in nature is generally termed "proto-lignin" and varies somewhat depending on the particular source of lignocellulose material. The principal variation in lignin, depending on its source, appears to be the number of methoxy groups present in the molecule. Thus it has been estimated that hardwood lignin contains about 20% to 21% by weight of methoxy groups, that lignin from soft woods contains about 14% to 15% of methoxy groups and that lignin from grasses contains only about 0 to 1% of methoxy groups. However, the methoxy groups contained in lignin are substantially non-reactive and such differences in the content of methoxy groups are not regarded as having substantial importance in connection with the practice of the present invention.

When the proto-lignin content in naturally occurring lignocellulose material is separated from the cellulose fiber and later is recovered, the naturally occurring proto-lignin is affected by the recovery process, with the result that the lignin which is ordinarily referred to in the art when this term is used is the recovered lignin rather than the proto-lignin occurring in the natural lignocellulose material. In the practice of this invention it is the recovered lignin which is employed and which is referred to herein. Due to the greater complexity and reduced solubility of the naturally occurring proto-lignin it would not lend itself for use in the production of resins according to the present invention.

The lignin which is preferably employed in the practice of this invention is the lignin which is known as "alkali lignin" and which is produced as a by-product of alkaline pulping using either the soda process wherein the pulping liquor contains sodium hydroxide or the sulfate process wherein the pulping liquor contains both sodium hydroxide and sodium sulfide. During either pulping process the lignin is dissolved in the pulping liquor as a salt of lignin and is conventionally recovered from the pulping liquor by acid precipitation. The lignin can be recovered from such acid precipitation as free lignin or as a lignin salt, depending upon the specific conditions under which the lignin is obtained. If the lignin is precipitated at a high pH, generally about 9.5 to 10.0, the salt of lignin is obtained, while if the lignin precipitated at a high pH is acid washed so as to substantially free the lignin from its salt, free lignin is obtained. Moreover, lignins of slightly different characteristics can be obtained depending upon the pH at which the lignin is precipitated from the pulping liquor. Thus a pulping liquor of a pH of 12.5 can be acidified to a pH of 10.0 where a fraction of the lignin will be precipitated. If the precipitated lignin is removed and the pH of the pulping liquor further acidified to a pH of, say, 9.0, another fraction will be precipitated. This process can be continued until all of the lignin has been precipitated at a very low pH. The different fractions of lignin thus obtained possess slightly different characteristics such as their solubility in certain solvents due, it is believed, to lignin of slightly different molecular weights precipitating at the different pH levels. In the practice of this invention the different fractions of lignin referred to may be employed. Although either the alkali metal salt of lignin or free lignin may be employed in the practice of this invention it is generally preferable to utilize lignin in its free form as the lignin salt carries with it into the resin forming reaction substantial quantities of alkali metal which may affect the aging qualities of the resin product.

When reference is made herein to the employment of free lignin in the production of a synthetic resin, it is to be understood that the reference is to the free lignin that is added to the reaction mixture. Free lignin is insoluble in water whereas lignin recovered as the alkali metal salt is water soluble. The term "alkali lignin" as used herein and in the claims has reference both to the soluble alkali metal salt form and to the water insoluble free lignin form.

SUMMARY OF THE INVENTION

It is an object of this invention to produce new synthetic resinous materials and products by a resin-forming reaction of a polyisocyanate with alkali lignin that is in solution with a solvent for the lignin. A further object of this invention is the production of such resinous materials and products by resin-forming reaction of a polyisocyanate not only with alkali lignin, but also with a solvent for the alkali lignin that likewise is reactive with the polyisocyanate.

According to the present invention, it has been found that if lignin is dissolved in a solvent for the lignin and the resulting solution is intimately commingled with a polyisocyanate, the dissolved lignin and the polyisocyanate enter into a resin-forming reaction with each other whereby new synthetic resins are produced. The properties of the resulting synthetic resin may be varied depending upon the relative proportions of the lignin and the polyisocyanate and depending upon the nature of the solvent employed as well as the nature of possible additional components included in the reaction mixture. According to one of the more particular features of this invention, a solvent for the lignin is employed which likewise is reactive with the polyisocyanate, with the result that the new synthetic resin is the product of copolymerization and/or condensation of the polyisocyanate with both the lignin and reactive solvent components of the reaction mixtures.

According to this invention, the new synthetic resin may be produced in a variety of useful forms such as foams, elastomers, coatings, adhesives, castings, films, laminated products and the like, and it is a further object of this invention to produce such products utilizing alkali lignin as one of the components of the reaction mixture which results in the production of the new synthetic resin.

One of the advantages of this invention results from the low cost of lignin as a base material for use in the manufacture of a synthetic resin. However, it also is the case that lignin possesses special properties which are of value in the production of a synthetic resin by reaction with a polyisocyanate. Thus the lignin molecule itself when brought into solution with a solvent for the lignin has been found to be readily reactive with polyisocyanates. In the case of the reaction product between a polyisocyanate and a glycol a breakdown of urea linkages tends to effect reversion of the reacting components to the original liquid components. Since lignin is normally solid, such reversion to liquid components does not occur in the case of lignin that has been caused to react with a polyisocyanate. Moreover, to the extent that lignin is used in conjunction with a polyhydroxy compound such as a glycol, the lignin component tends to decrease the number of urea linkages subject to hydrolytic decomposition that are contained in the resin reaction product. Moreover, such hydrolytic decomposition is promoted by a retained catalyst such as amine catalyst, and by the use of alkali lignin according to this invention the amount of retained amine catalyst may be minimized.

Another advantage of this invention results from the fact that, to the extent that the lignin carboxyl reacts with an isocyanate group of the polyisocyanate, the resultant amide grouping is more stable in resistance to becoming hydrolyzed than are the urea linkages, and the fact that the number of urea linkages is reduced likewise contributes to the greater stability of the synthetic resin product.

The utilization of the lignin in solution makes it possible to control the viscosity of the reaction mixture with which the polyisocyanate is commingled. This fact is especially desirable in the production of foams inasmuch as in the production of foams a gas or vapor is caused to be dispersed in the form of a multiplicity of bubbles through the reaction mixture. By effecting the desired viscosity increase by the employment of lignin the retention of the gas or vapor introduced for the purpose of foaming may be promoted. Heretofore in order to provide the desired viscosity in the production of a foam, it has been proposed to prepare a prepolymer whereby at least a portion of the components of the reaction mixture are permitted to react with accompanying increase in viscosity and until such time that the viscosity is regarded as appropriate for retaining a gas or vapor dispersed in the reaction mixture.

Another expedient which has been employed heretofore is that of using a catalyst which in amount and activity is such as to cause a very rapid increase in viscosity of the reaction mixture due to the rapidity of the reaction whereby the original liquid components are converted to the solid or semi-solid state, this type of operation usually being referred to as a "one-shot process." However, the presence of the catalyst when used in an amount suitable for a one-shot process becomes undesirable to the extent that it is retained in the foamed resin inasmuch as the catalyst tends to promote the degradation of the resin upon aging. Accordingly, it is of advantage in the practice of this invention that viscosities desirable for foam retention may be afforded without resorting to the prepolymer technique while at the same time cutting down very materially on the amount of the catalyst as compared with the "one-shot" type of procesisng.

Another advantage of this invention results from the fact that the elimination of any free isocyanate radicals is facilitated. The lignin molecule in addition to the carboxyl contains several hydroxyl groups, some of which are aliphatic hydroxyls and some of which are phenolic hydroxyls. These hydroxyls are available for reaction with the isocyanate groups of the polyisocyanate, but the size of the lignin molecule as well as its normally solid state enables a resin of desired solid consistency to be obtained even though some of the hydroxyls of the lignin remain without reaction with the isocyanate. Accordingly, the presence of free isocyanate in the reaction product may be substantially completely eliminated by the employment of alkali lignin in the reaction mixture according to this invention.

Another advantage of this invention results from the fact that when the alkali lignin is employed in combination with a glycol serves both as a solvent for the lignin and as a component reactive with the polyisocyanate, one may employ the glycols of relatively low molecular weight which are substantially less expensive than the relatively high molecular weight glycols heretofore employed for reaction with polyisocyanates in the production of resins. Thus, heretofore it has generally been the practice to employ an alkylene ether glycol such as polypropylene glycol having a molecular weight of approximately 2,000. One of the reasons for using such an alkylene ether glycol has been that of reducing shrinkage during the resin-forming reaction. In view of the high molecular weight of lignin, a corresponding setting up of the resin-forming ingredients may be accomplished using the substantially less expensive low molecular weight glycols without the objection due to shrinkage. Thus, for example, in the practice of this invention it is found to be preferable to employ polyethylene glycol having a molecular weight of about 600.

When the alkali lignin is used in the form of free lignin, the carboxyl of the free lignin enables the curing of the resin to be effected on the acid side. Such acid curing is especially useful when foaming is produced by reaction of the isocyanate groups with either water or carboxyl groups to produce carbon dioxide inasmuch as the carbon dioxide thus produced tends to neutralize an alkaline catalyst such as an amine and thus interferes with its catalytic activity.

Another advantage of this invention results from the fact that when lignin is employed the amount of the polyisocyanate may be reduced, the polyisocyanate being considerably the most costly of the main reaction ingredients.

Any organic material which is a solvent for lignin may be employed for placing the lignin in solution for reaction with the polyisocyanate. The particular solvent employed is dependent upon the type of product to be produced. For many purposes, the solvent that is employed is a solvent containing a radical or group comprising a hydrogen atom that is reactive with the isocyanate groups of the polyisocyanate. For the most part, such solvents contain hydroxyl groups although, as mentioned above, carboxyl groups likewise are reactive with the isocyanate. Amines also contain reactive hydrogen. The solvent for many purposes is substantially non-volatile. However, a volatile solvent may be used as well as mixtures of volatile and substantially non-volatile solvents. For example, in the production of the foam a substantially non-volatile solvent may be used in a major amount in combination with a small amount of a low boiling volatile solvent adapted to become converted into vapor during the resin-forming reaction, thereby producing a multiplicity of bubbles in the resinous reaction product. Volatile solvents are of particular applicability in the fields of coatings and adhesives. In addition to reactive solvents, non-reactive solvents may be employed and, in such case, the resin-forming reaction may be affected substantially entirely between the dissolved alkali lignin and the polyisocyanate.

The reactive substantially non-volatile solvents which are of particular utility in the practice of this invention include glycols and glycol ethers. Examples of such solvents are butyl Carbitol, butyl Cellosolve (ethylene glycol monobutyl ether), Carbitol (diethylene glycol monoethyl ether), Cellosolve (ethylene glycol monoethy ether), Cellosolve acetate, polyethylene glycols ranging from diethylene glycol to molecular weights up to about 6,000 dimethoxy tetraglycol, dipropylene glycol methyl ether, methyl Carbitol (diethylene glycol monomethyl ether), methyl Cellosolve (ethylene glycol monomethyl ether), methyl Cellosolve acetate, phenyl Cellosolve, propyene glycol methyl ether, triethylene glycol, tripropylene glycol methyl ether. Polypropylene glycols having molecular weights above about 450 have limited solubility for alkali lignin but may be blended with ethylene glycol or polyethylene glycol or with some other common solvent. For many purposes it is preferable to employ polyethylene glycol having a molecular weight ranging from about 200 to 2000. Pentaerythritol likewise is a solvent for alkali lignin.

Esters such as diethyl sulfate, ethyl oxalate and triethyl phosphate are lignin solvents. Polyesters containing terminal hydroxyl groups or such terminal hydroxyl groups in combination with carboxyl groups may likewise be used, particularly those resulting from the condensation of polycarboxylic organic acid such as adipic, sebacic, succinic and the like with a polyalcohol such as ethylene glycol, polyethylene glycol ether alone or in combination with a minor amount of polyhydroxy compound containing three or more hydroxyl groups. Among the lower boiling alcohols that are solvents for alkali lignin are allyl, ethyl (absolute), isopropyl, methyl and tetradecanol. Alkali lignin also may be dissolved in aldehydes such as acetaldehyde, benzaldehyde and paraformaldehyde. Ketones provide solvents for the alkali lignin which are not reactive with the isocyanate, examples of such ketones being acetone, isophorone, mesityl oxide, methyl ethyl ketone and pantanedione. Phenols such as cresol, phenol and thymol likewise are solvents for alkali lignin. Other solvents include lutidine-2,4, lutidine-2,6, alpha-picoline, beta-picoline, gamma-picoline, pyridine, piperidine, quinoline, 1,4-dioxane, dioxolane, furfural, furfuryl alcohol, methyl morpholine, morpholine, propylene oxide, tetrahydrofurfuryl alcohol, tetrahydrophrane, thialdine, acrylonitrile, 2-nitro-2-ethyl-1, 3-propanediol (melted), 2-nitro-2-methyl-1-propanol (melted), dimethyl sulfolane, dimethyl sulfoxide and formamide.

Water is a solvent for the alkali metal and the ammonium salts of lignin. However, water is so extremely reactive with polyisocyanates that water is not availed of as a solvent for the lignin, but when used is only used in small amount for reaction with part of the polyisocyanate for the production of carbon dioxide as a by-product, the generation of the carbon dioxide resulting in the production of a foam. Similarly, a number of amines are solvents for alkali lignin, but the amines are likewise highly reactive with polyisocyanates and the amount of amine generally is limited to a small amount appropriate for catalyzing the reaction between the polyisocyanate and the alkali lignin or the alkali lignin together with a reactive solvent.

The polyisocyanate which is most generally available for use in the practice of this invention is toluene diisocyanate either in the form of the 2,4 isomer or mixtures of the 2,4 and 2,6 isomers. However, other diisocyanates may be employed, although the aromatic polyisocyanates are usually more reactive than the aliphatic diisocyanates. Other organic polyisocyanates include substances such as ethylene diisocyanate, propylene-1, 2-diisocyanate, butylene-1, 3-diisocyanate, triphenylmethane trisocyanate, 3,3'-bitolylene 4,4'-diisocyanate, 4,4'-methylenebis (2-methylphenyl isocyanate) and P-phenylene diisocyanate.

The new synthetic resins of this invention are produced by reacting a polyisocyanate with lignin in solution. This is preferably accomplished by dissolving alkali lignin in a selected solvent and then dispersing a diisocyanate intimately in the solution for reaction with the lignin and for reaction with such other substances comprised in the solution as were reactive with the isocyanate groups. Usually a catalyst for the reaction is used such as a tertiary amine. Alkali reactive metals likewise catalyze the reaction and, as aforesaid, when free lignin is employed the recation may be effected on the acid side.

DESCRIPTION OF THE PREFERRED EMBODIMENTS

The type of product which may be produced according to this invention may take a number of different forms and certain of these forms are described for purposes of illustration in connection with the examples given hereinbelow.

The production of a foam is illustrated by the following example:

Example 1

25 grams of free lignin were dissolved in 25 grams of polyethylene glycol, having molecular weight of about 600, at 120° C. The solution was heated to 130° C. to insure complete solution. The solution was cooled to 100° C. and two drops of surfactant sold under the trade designation "Tween 20" was incorporated therewith. The surfactant Tween 20 is polyoxyethylene sorbitan monolaurate. In a separate container 15 grams of toluene diisocyanate-2,4 were mixed with 1 gram of a foaming agent sold under the trade name "Freon 113," which is 1,1,2-trichloro-1,2,2-trifluoroethane and which is non-inflammable and boils at about 117.6° F. Toluene diisocyanate containing the Freon 113 was added to the solution of free lignin while the latter was at a temperature of about 115° C. with vigorous stirring. Chemical reaction commenced substantially immediately, including the development of foam, and the foaming mass was poured into a wooden mold lined with paper which had been preheated to a temperature of about 110° C. The foam rose quickly and began to set in about one minute. The resulting foam, which was not post-cured, had a density of 11.8 lbs. per cu. ft. A 2-cubic inch sample of the foam was tested for compressive strength. The compressive strength referred to both here and elsewhere in this application, unless otherwise stated, is the compressive strength at 50% deflection, using a TMI Universal Tester at a speed of 0.5 inch per minute. The percent recovery 30 minutes after 50% deflection also was measured. The compressive strength of the sample tested was 249 p.s.i. and it exhibited 74.2% recovery.

The production of foam as described above in connection with Example 1 was repeated using different relative quantities of free lignin and polyethylene glycol and the results of these tests appear in the following table, wherein Sample #4 is a product of Example 1. Samples #1, #2, #3, #4 and #5 were prepared without a catalyst. Samples #1A, #2A and #3A are the same as Samples #1, #2 and #3 except for the inclusion of 0.25 gram of N-methyl morpholine as a catalyst. Sample #4A is the same as Sample #4 except for the inclusion of 0.10 gram of N-methyl morpholine as a catalyst.

TABLE I

| Sample No. | Lignin percent | Glycol, percent | Diisocyanate, percent | Comp. str., p.s.i.[2] | Recovery, percent | Density lbs./cu. ft. |
|---|---|---|---|---|---|---|
| 1 | 15.4 | 62.5 | 23.1 | Very flexible | | |
| 1A[1] | 15.4 | 62.5 | 23.1 | Very flexible | | |
| 2 | 25.7 | 51.2 | 23.1 | 6.8 | 100.0 | 10.9 |
| 2A[1] | 25.7 | 51.2 | 23.1 | 13.6 | 100.0 | 11.3 |
| 3 | 33.0 | 44.0 | 23 | 160.0 | 96.0 | 15.0 |
| 3A[1] | 33.0 | 44.0 | 23 | 153.0 | 100.0 | 15.3 |
| 4 | 38.5 | 38.5 | 23 | 249.0 | 74.2 | 11.8 |
| 4A[1] | 38.5 | 38.5 | 23 | 224.0 | 85.6 | 13.5 |
| 5 | 42.5 | 34.2 | 23.3 | 204.0 | 65.6 | 7.7 |

[1] N-methyl morpholine used.
[2] Compressive strength at 50% deflection.
[3] Percent recovery 30 min. after 50% deflection.

In addition to Freon 113, other agents may be employed for the production of a gas or vapor so as to produce a foam, such agents being commonly referred to as "blowing agents." The following example illustrates the use of toluene as a blowing agent:

Example 2

20 grams of free lignin were dissolved in 20 grams of polyethylene glycol having a molecular weight of about 400 while at a temperature of about 130° C. The solution was cooled to 100° C. and 2 grams of toluene plus 1 gram of Tween 20 were added to the solution. 15 grams of toluene diisocyanate-2,4 were then vigorously mixed with the solution. There was immediate chemical reaction including the production of foam as a result of the conversion of the toluene from liquid to vapor. The reaction mixture was poured into a metal mold that had been preheated to about 121° C. A rigid foam was thus produced having a density of 12.7 lbs. per cu. ft.

Another suitable blowing agent which decomposes to produce gas to cause foaming is that sold under the trade designation "Celogen," which is oxybis P,P' (benzenesulfonyl hydrazide).

The use of Celogen is illustrated by the following:

Example 3

30 grams of free lignin were dissolved in 30 grams of polyethylene glycol having a molecular weight of about 600 at a temperature of 130° C. The solution was cooled to 110° C. and 1 gram of Celogen was added thereto, followed by 0.5 gram of Tween 20. There was added to the resulting solution while at a temperature of about 95° C. 20 grams of toluene diisocyanate-2,4. The resulting foaming mixture was poured into a mold which had been preheated to a temperature of 150° C. A good rigid foam was produced having a density of 7.1 lbs. per cu. ft.

The use of water as a blowing agent is illustrated by the following example:

Example 4

20 grams of free lignin were dissolved in 25 grams of polyethylene glycol having a molecular weight of about 600 while at a temperature of 130° C. The solution was cooled to 95° C. and there were added thereto 1.8 grams of water and 1 gram of Tween 20. After the solution had been cooled to 90° C. 25 grams of toluene diisocyanate-2,4 were added. The foaming reaction mixture was poured into a preheated wooden mold. The resulting product was a good rigid foam having a density of 4.5 lbs. per cu. ft. and having a compressive strength of 52.7 p.s.i. at 50% deflection. In this instance the foam resulted from the production of carbon dioxide in the reaction mixture as a by-product of the reaction between the water and a portion of the toluene diisocyanate.

Moreover, a plurality of blowing agents may be employed which result in the production of gas or vapor at different temperatures of reaction. The reaction of the polyisocyanate with the lignin and with the reactive groups of a reactive lignin solvent is exothermic and as the temperature of the reaction mixture is increased foaming agents may successively result in the introduction of gas or vapor into the reaction mixture. For example, water may be used as a blowing agent in the initial stages of reaction, followed by the liberation of vapor at a higher temperature using a substance such as Freon 113, and at a still higher temperature using a substance such as Celogen.

Variations in the molecular weight of polyethylene glycol employed from 400 to 6,000 in combination with free lignin resulted in the production of good foams, the foams produced from the higher molecular weight polyethylene glycol having somewhat greater flexibility.

In the following example a mixture of polyethylene glycol and polypropylene glycol was employed.

Example 5

40 grams of free lignin were dissolved in a mixture of 20 grams of polyethylene glycol (molecular weight 600) and 20 grams of polypropylene glycol (molecular weight 425) at a temperature of 130° C. 10 drops of Tween 20 were added and the solution was cooled to 110° C. 20 grams of toluene diisocyanate-2,3 to which 1 gram of Freon 113 had been added to the solution. The foaming reaction mixture was poured into a metal mold which had been preheated to 121° C. A good rigid foam was obtained having a density of 7.1 lbs. per cu. ft.

According to the following example, a foam was produced using a polyester as a reactive solvent for the alkali lignin:

Example 6

10 grams of free lignin were dissolved in 40 grams of the polyester sold by Morton-Withers Chemical Co. under the trade designation "Morester 960," which is believed to be the reaction product of a polyol and a polycarboxylic acid. After the solution had been prepared at 150° C., it was cooled to 90° C., at which temperature there were added thereto 1 gram of water plus 5 drops of Tween 20. 0.5 gram of N-methyl morpholine were added as a catalyst and finally 15 grams of toluene diisocyanate-2,4 were stirred into the solution. A good semirigid, low density foam was obtained.

The production of a foam utilizing an inert solvent is illustrated by the following example:

Example 7

28 grams of free lignin were dissolved in 28 grams of acetone at room temperature and to this solution there were added 18 grams of toluene diisocyanate-2,4. The resulting mixture was heated to accelerate the reaction and likewise so as to cause vaporization of the acetone, the acetone vapor becoming entrapped in the form of a multiplicity of bubbles or pores. A rigid foam of high density was obtained.

A certain amount of foaming may be afforded without the employment of any blowing agent. The production of a foam in this manner is illustrated by the following example:

Example 8

25 grams of free lignin were dissolved in 50 grams of polyethylene glycol (molecular weight 600) at a temperature of 130° C. The solution was cooled to 75° C. and there was added thereto 4 drops of the surfactant Tween 20 and 0.2 gram of the catalyst N-methyl morpholine. 30 grams of toluene diisocyanate-2,4 were added, whereupon there was a gentle foaming action giving rise to the production of a finely porous structure having a density of 18.5 lbs. per cu. ft. The foam thus produced had a compressive strength of 500 p.s.i at a 50% deflection In the preparation of foams using a reactive solvent such as polyethylene glycol, the presence of lignin is of advantage in that it imparts viscosity favoring retention of gas or vapor generated within the reaction mixture. However, for practical purposes in avoiding excessive viscosity it is normally preferable that the ratio of alkali lignin to a polyethylene glycol solvent not exceed about 2:1. In such a foam, the percentage of lignin based on the total solids is approximately 48% and good rigid foams have been produced using this percentage of lignin. When, however, a volatile solvent is employed such as acetone or dioxane, the percentage of lignin may be further increased and, in fact, the lignin may be the sole resin-forming agent for reaction with polyisocyanate. On the other hand, when one of the resin-forming components is a reactive solvent, the advantages of this invention are realized whenever a substantial amount of alkali lignin is present for reaction with the polyisocyanate.

As compared with the other components of the reaction mixture, the isocyanate is much more expensive than the other components. Accordingly, it is desirable to hold down the amount of polyisocyanate, although when water is used as the blowing agent by reaction with excess polyisocyanate over and above that required for reaction with the alkali lignin and with the reactive solvent this requires the use of a substantial amount of polyisocyanate. By the employment of alkali lignin it is possible to greatly reduce the quantity of polyisocyanate, and the following example illustrates the production of a foam wherein the polyisocyanate only constitutes about 5% by weight of the solids:

Example 9

100 grams of free lignin were dissolved in 50 grams of polyethylene glycol (molecular weight 400) with production of a high viscosity solution at a temperature of about 130° C. 1 gram of Freon 113 and 2 grams of Celogen were added as blowing agents and 7.5 grams of toluene diisocyanate were added with the production of a high density foam, namely, a foam having a density of approximately 30 lbs. per cu. ft.

Alkali lignin also may be used with the less expensive and slower reacting mixtures of the 2,6 isomer of toluene diisocyanate. The following example illustrates the use of a toluene diisocyanate containing 35% of the 2,6 isomer.

Example 10

37.5 grams of free lignin were dissolved in 50 grams of polyethylene glycol (molecular weight 600) at approximately 120° C. 4 drops of Tween 20, 0.2 gram of N-methyl morpholine, 1 gram water, and 1 gram Celogen were then added followed by 48 grams of a 65:35 mixture of 2,4:2,6 isomers of toluene diisocyanate. A very rigid foam having a density of 8.95 pounds per cubic foot and a yield strength under compression of 140 p.s.i. was obtained.

While the foams exemplified hereinabove have employed a surfactant in the reaction mixture, the presence of a surfactant is not essential, as illustrated by the following example:

Example 11

25 grams of free lignin were dissolved in 25 grams of polyethylene glycol (molecular weight 600) at a temperature of 110° C. The solution was cooled to 90° C. and there was added to the solution 15 grams of toluene diisocyanate-2,4 to which 1 gram of water had been added. The composition resulted in the production of a foam having a density of 10.1 lbs. per cu. ft. and a compressive strength of 122 p.s.i. at 50% deflection.

Various other conventional surfactants may likewise be employed.

The reactivity of lignin with polyisocyanates is so great that the reaction proceeds rapidly even in the absence of a catalyst, as has been illustrated hereinabove in connection with Example 1. N-methyl morpholine has, however, been found to be an especially suitable catalyst, although other conventional catalysts of the amine type may be used such as triethylamine and N,N,N',N'-tetramethyl-1,3-butanediamine.

Although the previous examples have shown the use of toluene diisocyanates, other diisocyanates are equally as adaptable in the practice of this invention as shown in the following example:

Example 12

21.4 grams of free lignin were dissolved in 28.6 grams of a polyethylene glycol (molecular weight of 600) and heated to 130° C. 5 drops of Tween 20 were added and the solution cooled to 110° C. A mixture of 15 grams of hexamethylene diisocyanate and 1 gram of Freon 113 were then added to the solution. A soft, very flexible foam was obtained.

Foams produced according to this invention may be utilized for a variety of different purposes such as thermal insulation, sound insulation, resistance to impact, reinforcements, cushioning and the like.

One type of product for which the lignin-containing foam of this invention is suitable is reinforced paperboard. The following is an example of a product of this type:

Example 13

25 grams of free lignin were dissolved in 50 grams of polyethylene glycol (molecular weight 600) at 130° C. This solution was allowed to cool to 100° C., at which temperature a mixture of 0.2 g. N,N,N',N'-tetramethyl-1,3-butanediamine, 2 g. Celogen, and 2 g. water were added and thoroughly mixed. The temperature dropped to 70° C. A mixture of 2 g. of Freon 113 and an 80:20 toluene diisocyanate-2,4:toluene diisocyanate-2,6 was added. Foaming began within a minute. The foam was poured on the undulating surface of single face corrugated board. A sheet of kraft paper was placed on the top of the foam and pressed until contact was made with the crests of the laminated board. The sample was cured 30 min. at 100° C. in an oven. The lignin-containing foam filled the corrugations covered by the paper and the foam adhered both to the corrugated board and to the kraft paper to provide a structurally strong paperboard.

A paper-surfaced sandwichboard having a foam core was prepared according to the following example:

Example 14

The foam formulation was prepared by dissolving 50 grams of free lignin in 50 grams of polyethylene glycol (molecular weight 600) at 85° C. 0.2 gram of N-methyl morpholine, 1.85 grams of water, and 4 drops of Tween 20 were added to the lignin solution reducing the temperature to 80° C. When the temperature fell to 60° C. 20 grams of a 80:20 mixture of 2,4:2,6 toluene diisocyanate were added. The foam material while still incompletely cured was sandwiched between two pieces of kraft paper. The foam adhered strongly to the paper-surfacing layers and a structurally strong paper-surfaced sandwichboard was provided having desirable properties of toughness, insulating effectiveness and resistance to moisture.

The use of the new synthetic resin of this invention as a coating is illustrated by the following example:

Example 15

25 grams of free lignin were dissolved in 30 grams of dioxane at 80° C. To this solution, 25 grams of polyethylene glycol (molecular weight 600) were added. The resulting solution was cooled to room temperature and 15 grams of toluene diisocyanate-2,4 were added. The solution was applied as a coating 0.15 inch in thickness which was baked in an oven at 110° C. for 30 minutes. The resulting coating possessed excellent flexibility as well as good adhesion and hardness and it resisted boiling water without noticeable effect for over 30 minutes.

When the formulation of the foregoing coating was modified so as to reduce the content of the poylethylene glycol, the coating became less flexible and the coating possessed good hardness and good adhesion. A low order of flexibility was obtained when the polyethylene glycol component was omitted.

The new synthetic of this invention likewise has utility as an adhesive, as illustrated by the following example:

Example 16

15 grams of free lignin were dissolved in 30 grams of polyethylene glycol (molecular weight 600) and the solution was heated to 170° C. for 30 minutes to effect esterification of the lignin carboxyl with the glycol, thereby blocking the carboxyl group, which otherwise would result in reaction with the polyisocyanate to produce carbon dioxide in the reaction mixture. After the esterification had been completed, the solution was cooled to 50° C. and 15 grams of toluene diisocyanate-2,4 was added. The resulting solution was applied to steel strips ½ inch wide which were disposed face-to-face with the adhesive between the opposed faces. The strips bonded by the adhesive were permitted to cure for 20 hours at 110° C. A maximum shear strength of 1,660 p.s.i. was attained.

The following example illustrates the production of a casting composed of the new synthetic resin of this invention:

Example 17

10 grams of free lignin were dissolved in 40 grams polyethylene glycol (molecular weight 600) and the solution was heated for two hours at 160° C. to esterify the lignin carboxyl. The solution was then cooled to 40° C. and 15 grams of toluene diisocyanate-2,4 were added. The temperature then rose to 50° C. and there was an increase in the viscosity of the solution. The casting was placed in an oven at 110° C. for ten hours to produce a flexible tough casting.

The following example illustrates the production of a film utilizing the new synthetic resin of this invention:

Example 18

21.4 grams of free lignin were dissolved in a mixture of 28.6 grams of polyethylene glycol (molecular weight 600) and 40.0 grams of dioxane. 15 grams of toluene diisocyanate-2,4 were added to the solution and the solution was thereupon applied to the surface of a piece of paper in ten layers, each layer being cured at 110° C. for 30 minutes prior to application of the next succeeding coat. The film thickness was built up to 0.011 inch. The film possessed a tensile strength of 3,760 p.s.i., this being the value obtained by subtracting the tensile strength of the uncoated paper from the tensile strength of the coated paper.

The new synthetic resin of this invention is likewise adapted for use as a water-proof glue, as illustrated by the following example:

Example 19

21.4 grams of free lignin were dissolved in a mixture of 28.6 grams of polyethylene glycol (molecular weight 600) and 40 grams of dioxane. 15 grams of toluene diisocyanate-2,4 were added to the solution, which was applied as an adhesive between two pieces of paper. The paper sheets thus glued together were placed in an oven at 110° C. for 20 minutes. Upon cooling, the glued paper was immersed in water for 30 minutes without a detectable decrease in bond strength between the paper sheets.

In the practice of this invention it is preferable to employ free lignin. However, as mentioned hereinabove, one may also use alkali lignin in the form of a salt such as lignin sodium salt or the ammonium salt of lignin. Other lignin salts may likewise be employed. Moreover, it is likewise possible to utilize in the practice of this invention lignin in modified forms which contain in substantial degree the groups which are reactive with the isocyanate groups of a polyisocyanate. For example, the methoxy radical content of the lignin is relatively inert and, this being the case, the methoxy radical content of the lignin may be wholly or partially removed from the lignin molecule with complete or partial replacement of correspondingly positioned hydroxyls. Lignin may also be modified to form either an ester or an ether so long as such treatment does not result in the total loss of groups reactive with the isocyanate groups of the polyisocyanate. The esterification of the lignin carboxyl has been illustrated hereinabove in connection with Examples 16 and 17 and such esterification of the lignin carboxyl constitutes a desirable feature of this invention for those applications wherein it is desired to minimize the production of bubbles in the reaction mixture. However, in elastomeric applications of the practice of this invention it is possible by milling the cured or semi-cured resin to remove any entrapped gases or vapors.

On the other hand, if it is desired to increase the proportion of carboxyl groups available for reaction with isocyanate groups, this may be accomplished by causing the alkali lignin to react with an anhydride such as phthalic, maleic, dodecenyl succinic, methyl nadic, hexahydrophthalic, tetrahydrophthalic, pyromellitic, and trimellitic anhydrides. The addition of carboxyl groups to the lignin in this manner enables foaming with polyisocyanate to be accomplished utilizing substantially less polyisocyanate for the blowing reaction than is the case when water is used for this purpose.

Other forms of modified alkali lignin which have been found to be suitable in the practice of this invention are alkali-cooked lignin, oxidized free lignin, alkali lignin recovered either at a low pH or a high pH and acetone-soluble lignin. The type of lignin which is referred to as "Rheinau" lignin and which is obtained as a by-product of the production of wood sugars from natural lignocellulose material utilizing mild hydrochloric acid may also be employed but is less desirable than conventional alkali lignin.

It is also possible by proper modification of the alkali lignin and/or by proper choice of a diisocyanate to practice this invention without the use of a separate solvent. It has been found that some types of lignin are soluble directly in the diisocyanate and will react therein. It has also been found that most lignins can be dissolved in certain diisocyanates. For example the lignin products produced by the reaction of alkali lignin with allyl chloride, benzyl chloride, and diethyl sulfate are soluble in 2,4 toluene diisocyanate and mixtures of 2,4 and 2,6 toluene diisocyanate. By addition of surfactants, catalysts, and/or blowing agents to the ligninisocyanate solution foams can be easily prepared. Free lignin is also soluble at 150° C. in a blocked 4,4-'methylene bis (2 methyl phenyl isocyanate) sold under the trade designation of "Hylene MP."

While this invention has been described in connection with various examples and specific ways of practicing the invention, it is to be understood that this has been done for the purposes of illustration and that the practice of this invention may be varied within the scope of the principles employed in the practice thereof as hereinabove set forth.

We claim:

1. In a method of producing a synthetic resin wherein lignin that comprises carboxyl groups is dissolved in a substantially non-volatile solvent for said lignin to form a liquid solution of said lignin in said solvent, said solvent containing hydroxyl groups reactive with isocyanato groups of an organic polyisocyanate, and an organic polyisocyanate is intimately mixed with said solution and reacts with said lignin and with hydroxyl groups of said solvent to form the synthetic resin, the improvement of subjecting said solution of said lignin in said solvent to a temperature and for a time which effect esterification of carboxyl groups comprised in said lignin prior to the resin-forming reaction with said polyisocyanate thereby effectively minimizing the number of carboxyl groups comprised in said lignin otherwise available during the resin-forming reaction for reaction with the polyisocyanate to form carbon dioxide gas bubbles in the synthetic resin.

2. A method of producing a synthetic resin which comprises dissolving directly in toluene diisocyanate in the absence of a solvent the product of reacting alkali lignin with a substance selected from the group consisting of allyl chloride, benzyl chloride and diethyl sulfate to form a solution of said reaction product in said toluene diisocyanate and reacting said dissolved reaction product with the toluene diisocyanate to form a synthetic resin.

3. A method of producing a synthetic resin which comprises dissolving alkali lignin directly in blocked 4,4'-methylene bis(2 methyl phenyl isocylanate) in the absence of a solvent to form a solution of said alkali lignin in said isocyanate and reacting the dissolved alkali lignin with said isocyanate to form a synthetic resin.

References Cited

UNITED STATES PATENTS 2,854,422   9/1958   Nichols _____ 260—17.5
2,906,718   9/1959   Mills et al. _____ 260—17.5

WILLIAM H. SHORT, Primary Examiner

E. A. NIELSEN, Assistant Examiner